United States Patent
Schmidt et al.

(10) Patent No.: US 10,717,140 B2
(45) Date of Patent: Jul. 21, 2020

(54) DEVICE FOR THE ELECTROCHEMICAL PROCESSING OF A METAL WORKPIECE

(71) Applicant: LEISTRITZ TURBINENTECHNIK NÜRNBERG GMBH, Nürnberg (DE)

(72) Inventors: Georg Schmidt, Schwabach (DE); Cindy Liebl, Wendelstein (DE)

(73) Assignee: LEISTRITZ TURBINENTECHNIK NÜRNBERG GMBH, Nürnberg (DE)

( * ) Notice: Subject to any disclaimer, the term of this patent is extended or adjusted under 35 U.S.C. 154(b) by 57 days.

(21) Appl. No.: 15/979,683

(22) Filed: May 15, 2018

(65) Prior Publication Data
US 2018/0333795 A1    Nov. 22, 2018

(30) Foreign Application Priority Data
May 17, 2017    (DE) .......................... 10 2017 110 733

(51) Int. Cl.
*B23H 3/04*    (2006.01)
*B23H 9/10*    (2006.01)
(Continued)

(52) U.S. Cl.
CPC ................. *B23H 3/04* (2013.01); *B23H 3/02* (2013.01); *B23H 3/10* (2013.01); *B23H 9/10* (2013.01);
(Continued)

(58) Field of Classification Search
CPC ... B23H 3/00–10; B23H 7/22–32; B23H 9/10
See application file for complete search history.

(56) References Cited

U.S. PATENT DOCUMENTS

| | | | |
|---|---|---|---|
| 5,945,009 A | 8/1999 | Beck et al. | |
| 9,682,437 B2 | 6/2017 | Platz | |

(Continued)

FOREIGN PATENT DOCUMENTS

| | | |
|---|---|---|
| DE | 19617548 C1 | 10/1996 |
| DE | 102008012596 B4 | 9/2009 |

(Continued)

OTHER PUBLICATIONS

Chinese Patent Office issued Office Action and English translation thereof in Chinese Patent Application No. 201810476474.1 dated Oct. 12, 2019, 5 pages.

*Primary Examiner* — Nicholas A Smith
(74) *Attorney, Agent, or Firm* — Lucas & Mercanti, LLP; Klaus P. Stoffe

(57) ABSTRACT

A device for the electrochemical processing of a metal workpiece, including a plurality of electrodes that by way of respective linear drive units are movable in a linear manner relative to the workpiece from an initial position to a terminal position, the electrodes having a reproduction face that is directed toward the workpiece, wherein at least three electrodes are provided, the electrodes being disposed so as to be offset around the circumference of the workpiece and by way of the reproduction faces of the electrodes during the entire readjustment movement from the initial position to the terminal position engaging across one another in portions so as to be in contact, and by way of the reproduction faces of the electrodes delimiting a fluid duct that in a closed manner encircles the circumference of the workpiece.

21 Claims, 4 Drawing Sheets

(51) Int. Cl.
*B23H 11/00* (2006.01)
*B23H 3/02* (2006.01)
*B23H 3/10* (2006.01)
*F01D 9/04* (2006.01)

(52) U.S. Cl.
CPC .......... *B23H 11/003* (2013.01); *F01D 9/041* (2013.01); *B23H 2300/10* (2013.01); *B23H 2400/00* (2013.01); *B23H 2500/20* (2013.01); *B23H 2600/10* (2013.01); *F05D 2220/32* (2013.01); *F05D 2230/10* (2013.01)

(56) References Cited

U.S. PATENT DOCUMENTS

| | | | |
|---|---|---|---|
| 2002/0143492 A1* | 10/2002 | Wei | B23H 3/02 702/171 |
| 2005/0039553 A1* | 2/2005 | Chen | F16H 25/20 74/22 R |
| 2006/0201823 A1 | 9/2006 | Zbeblick | |
| 2015/0027904 A1 | 1/2015 | Platz | |

FOREIGN PATENT DOCUMENTS

| | | | | |
|---|---|---|---|---|
| DE | 102011082795 A1 * | 4/2012 | | B23H 3/04 |
| DE | 102011082795 A1 | 4/2012 | | |
| DE | 102012201052 A1 | 7/2013 | | |
| DE | 102015102720 A1 * | 8/2016 | | B23H 3/04 |
| DE | 102015102720 A1 | 8/2016 | | |
| EP | 1535687 B1 | 6/2005 | | |
| GB | 952719 A | 3/1964 | | |
| RU | 2058863 C1 | 4/1996 | | |
| SU | 189275 A1 | 6/1966 | | |

* cited by examiner

DEVICE FOR THE ELECTROCHEMICAL PROCESSING OF A METAL WORKPIECE

CROSS-REFERENCE TO RELATED APPLICATIONS

The present application claims priority of DE 10 2017 110 733.9, filed May 17, 2017, the priority of this application is hereby claimed and this application is incorporated herein by reference.

BACKGROUND OF THE INVENTION

The invention relates to a device for the electrochemical processing of a metal workpiece, comprising a plurality of electrodes that by way of respective linear drive units are movable in a linear manner relative to the workpiece from an initial position to a terminal position, said electrodes having a reproduction face that is directed toward the workpiece.

A method for electrochemical subtraction (ECM—electrochemical machining) is used for processing metal workpieces which are composed of an electrically conductive material when complex geometries are to be generated. A vane component of a turbomachine, for example a jet engine vane, or similar, is an example of a workpiece that can be produced by such ECM processing.

An ECM method is a reproduction method that does not involve chips. A device that serves this purpose comprises a plurality of electrodes which by means of a suitable linear drive unit are movable in a linear manner from an initial position, in the case of an as yet unprocessed workpiece, to a terminal position having a workpiece that then is processed. These movable electrodes form respective cathodes while the component forms the anode. A gap-type fluid duct which encircles the workpiece in a closed manner such that an electrolyte which absorbs and transports away the released material can circulate in said duct is formed during the entire reproduction method between the reproduction faces that are directed toward the workpiece and define the three-dimensional final geometry which the workpiece is intended to have, and the material surface per se.

Such a device is known, for example, from DE 10 2012 201 052 A1. The device therein that is conceived for the production of vanes of a turbomachine comprises a plurality of separate electrodes. When viewed in the longitudinal direction of the workpiece, therein thus the vane, and thus across the length of the vane blade between the vane root and the shroud ring, three electrodes which are movable relative to the vane surface at various angles are provided in the case of the device therein, this enabling the electrodes to move even below undercuts that are to be maintained. When viewed in the circumferential direction, thus around the vane blade per se, a total of six electrodes are provided, wherein the electrodes that configure the vane blade upper side and the vane blade lower side, when viewed in the longitudinal direction of the vane blade, are in turn composed of the three electrodes described. The electrodes that are disposed so as to be distributed around the circumference of the vane blade by way of respective linear drives are likewise moved in a linear manner in relation to the vane surface, said electrodes being mutually spaced apart during the movement and meeting one another only once the terminal position has been reached, so as to in this position configure the final three-dimensional blade geometry.

Since the electrodes, which are distributed around the circumference and between which respective sealing elements are provided in order for the fluid duct encircling the vane blade to be closed and sealed, are mutually spaced apart during almost the entire readjustment movement up to reaching the terminal position, or are converged only then, respectively, regions which are not processed or only inadequately processed consequently result between the individual electrodes, this resulting from the specific situation that no electrode or reproduction face, respectively, is assigned to or is opposite, respectively, said region between the mutually spaced apart electrodes. Respective material portions are therefore processed and removed only at the last moment, wherein this at times is even performed in that solid parts are removed, the bonding of the latter to the workpiece being severed only shortly prior to or upon reaching the terminal position by way of the electrodes which in this instance are very tightly converged.

A relatively inhomogeneous surface processing thus takes places, since no processing initially takes place in the regions between the adjacent and mutually spaced apart electrodes that are just being converged, said processing at times being only rudimentary even as the electrodes are progressively fed. Consequently, zones are invariably configured in the abutment region between two adjacent electrodes on the workpiece, the processing of said zones being different or inhomogeneous, respectively, in comparison to the processing of the adjacent faces that are engaged across by an electrode during the feeding movement of the latter. This leads to a surface of the finished workpiece that includes inhomogeneities.

Difficulties also result in particular in the region of the vane blade edges. The upper and the lower side of the vane blade are processed by way of large-area electrodes. Consequently, zones which are set at a very acute angle, up to a course that is parallel with the direction of movement of the adjacent electrode that processes the upper and the lower side thus arise in the region of the edges, thus where there are very tight radii. The difficulties described above result in particular in the edge region, where the operation in the prior art is carried out only by way of a very narrow electrode that processes the edge region, this electrode likewise converging with the adjacent upper-side or lower-side electrode only shortly prior to reaching the terminal position.

SUMMARY OF THE INVENTION

The invention is thus based on the object of specifying a device for the ECM processing of metal workpieces, in particular of vane components of a turbomachine, that is improved in comparison to the above.

In order for this object to be achieved it is provided according to the invention in the case of a device of the type mentioned at the outset that at least three electrodes are provided, said electrodes being disposed so as to be offset around the circumference of the workpiece and by way of the reproduction faces of said electrodes during the entire readjustment movement from the initial position to the terminal position engaging across one another in portions so as to be in contact, and by way of the reproduction faces of said electrodes delimiting a fluid duct that in a closed manner encircles the circumference of the workpiece.

The invention is distinguished in that adjacent electrodes are in peripheral contact and engage or overlap across one another, respectively, during the entire readjustment movement, such that said electrodes by way of the reproduction faces thereof which by virtue of the contact in the overlap adjoin one another, delimit the closed and gap-type fluid duct that encircles the workpiece. Although the electrodes change the mutual relative positions thereof during the readjustment movement, since said electrodes are readjusted relative to the workpiece in dissimilar directions of movement, they remain in permanent contact, wherein the overlap increases during the readjustment movement since the electrodes converge even further by virtue of the subtraction of material. By virtue of the permanent contact the fluid duct also remains permanently delimited and closed by way of the reproduction faces.

This leads to the entire workpiece region to be processed which is engaged across by the reproduction faces being permanently engaged across, meaning that each surface point of the workpiece region which is engaged across by the combined large reproduction faces during the entire ECM processing has one opposite reproduction face. This in turn leads to the entire workpiece region which is engaged across being able to be homogeneously processed; consequently, no edge or peripheral regions result at the transition from one electrode to another since there is also no electrode gap in this transition region by virtue of the engagement or overlap, respectively. The completely processed workpiece consequently displays a homogeneous processing pattern in the region that is processed by way of the reproduction faces; the quality of work is significantly improved in comparison to conventional working practices.

In order to guarantee that the electrodes, despite the contact, are movable relative to one another during the readjustment movement, on the one hand, and that the sealing of the fluid duct is provided, on the other hand, it is expedient for an electrode that is provided between two electrodes on the reproduction face to have two sliding faces by way of which said electrode slides on respective outer sliding faces of the two adjacent electrodes. The mutually interacting electrodes thus have respective sliding geometries which enable said electrodes to bear on one another in a planar manner and to slide on one another in a planar manner. In the case of a vane component, for example, two mutually opposite electrodes are provided, one of those having a reproduction face for configuring the upper-side geometry, and the other having a reproduction face for configuring the lower-side geometry. A third electrode, disposed between said two electrodes, by way of the reproduction face of the former serves for configuring the edge region of the vane component. Said third, central electrode on the reproduction face thereof has the reproduction face which in the final geometry defines the vane edge geometry, on the one hand, but also two sliding faces that are disposed so as to be adjacent to said reproduction face and impart a substantially V-shaped geometry to the entire reproduction face, on the other hand. These two sliding faces slide on the quasi complementary sliding faces that are configured on the electrode external side of the two adjacent electrodes. By virtue of the planar electrode support face a permanent contact which permits positive guidance, on the one hand, but also a tight contact which seals the fluid duct in each mutual relative position of the electrodes, on the other hand, consequently results. The electrodes which in most instances are made from brass permit simple, low-friction sliding.

Should a flat component that is elongate in the cross section, having rounded edges, such as, for example, a vane component, be formed, two mutually opposite electrodes are consequently provided, said two electrodes having the reproduction faces reproducing the upper and the lower side of the workpiece, while the at least one third electrode, disposed between said two mutually opposite electrodes, has a reproduction face that preferably reproduces the edge region of the workpiece. However, should the workpiece have another geometry, the reproduction faces of the upper and the lower electrode and of the at least one lateral electrode are naturally embodied in a different manner, depending on the three-dimensional final geometry to be machined.

In the case of a flat component having two lateral edges, such as, for example, a vane component, it is furthermore expedient for the second edge to also be imparted a targeted processing, to the extent that the latter is required. In this case, it is expedient for a fourth electrode, opposite the third electrode, to be provided, said fourth electrode having a reproduction face that preferably reproduces the edge region of the workpiece. Four electrodes are thus used in this case, said four electrodes in the case of a vane component being movable in a mutually orthogonal manner, for example. The two electrodes configuring the edges, in the exemplary case the third and the fourth electrode, by way of the respective edges thereof or sliding faces thereon, respectively, engage across the two electrodes configuring the upper and the lower side, thus the first and the second electrode, on the outer sliding faces on the latter two. This electrode arrangement, or this type of cross-engagement, respectively, is however also expedient when a component other than a vane component is to be produced.

In principle, three or four electrodes can thus be provided, independently of the geometry of the workpiece to be produced.

However, if a vane component of a turbomachine, having a vane portion with a flat, elongate cross section is produced as the workpiece, the first and the second electrode by way of the respective reproduction faces thereof form the flat upper and lower side, as has been described, while the third and optionally the fourth electrode have reproduction faces reproducing the edge region having a small radius.

If only three electrodes are used, this being sufficient, for example, when a workpiece is to be processed on only three sides, it is expedient for the two outer electrodes to slide along a positionally fixed duct component that delimits the fluid duct. This duct component which functions as a sealing element serves as a sealing and sliding face on which the two outer electrodes bear and along which the latter slide. A three-electrode configuration of this type is expedient even in the case of a vane component in which the vane edge which adjoins the duct component is either not processed or is processed in a downstream processing step, wherein the two outer electrodes which slide along the duct components can also contact one another in the terminal position, such that a defined subtraction of material is also provided in this edge region, without a defined edge geometry being configured by way of a fourth electrode.

However, should four electrodes be used, two mutually opposite electrodes engage across the two other electrodes. Such a geometry is particularly advantageous in the production of a vane component of a turbomachine when both edge regions require processing and the vane component is to be three-dimensionally designed in a single operating procedure.

By virtue of the cross-engagement of the electrodes it is possible for the motion axes of the linear drive units of two adjacent electrodes to be disposed at a mutual angle of 90°, that is to say that the motion axes of the linear drive units in the case of three or four electrodes run so as to be mutually perpendicular, even in the case of a complex workpiece geometry such as, for example, a vane of a turbomachine, having curved faces and optionally faces that twist in the longitudinal direction. However, this is not mandatory. Depending on the concrete geometry of the workpiece to be made, it can indeed also be quite expedient for the motion axes of the linear drive units of two adjacent electrodes to be disposed at a mutual angle of smaller than or larger than 90°.

In this context, it is particularly expedient for the linear drive units for readjusting the angle between the motion axes of two adjacent linear drive units to be movable along a circular path. In terms of the device per se this offers the possibility of varying the mutual spatial arrangement of the motion axes of the linear drive units and thus the mutual relative position of said motion axes, such that a high degree of flexibility is provided on the part of the device. Since the electrodes are releasable elements which can be connected in a replaceable manner to the linear drive unit, there is thus the possibility of being able to retool the device for the production of workpieces of other shapes. It is indeed readily possible for the electrodes to be replaced and for electrodes which have reproduction faces of other shapes to be positioned, and also for the motion axes to be readjusted in a corresponding manner, and consequently for the angle between two adjacent motion axes to be modified. In this way, a high degree of flexibility is provided in terms of the workpieces that are producible by way of one device, or in terms of the reproduction of the corresponding surface geometries, respectively.

The readjustment of the linear drive units is performed in a simple manner in that the former are movable along a circular path. In order for the positioning to be rendered as accurate as possible, each linear drive unit by way of an actuator motor is preferably moved along the circular path so as to enable a highly accurate positioning and locking in the respective terminal position.

The movement of each electrode is performed by way of a separate linear drive unit, as has been described. Said linear drive unit preferably comprises a positionally fixed threaded spindle that is drivable by way of the drive motor, and a nut which runs on said threaded spindle and is coupled to an electrode holder. A spindle drive which enables a highly accurate positioning of the electrode is thus implemented. Alternatively, a threaded spindle which supports the electrode, is movable in a linear manner, and is coupled to the drive motor can also be provided.

A torque motor is preferably used as the drive motor, a highly accurate positioning also being possible by way of said torque motor. Moreover, when the device operates in a pulsed operation, the current and/or the voltage consequently not being permanently applied but being pulsed at a frequency of several Hz, the torque motor also offers the possibility of briefly moving the electrodes at a respective frequency out of the reproduction position in order for the fluid duct to be temporarily opened or enlarged, respectively, with the current and the voltage being switched off, and of subsequently immediately moving said electrodes back to the reproduction position, with the current and the voltage being applied.

A control installation which controls the operation of all relevant components of the device is expediently provided. The operation by way of this central control installation herein is preferably controllable in such a manner that the electrodes, firstly, proceeding from the initial position, in a first operating mode having a permanently applied current and a permanently applied voltage are movable in the direction of the workpiece and after reaching a defined intermediate position, in a second operating mode in a pulsed operation, are movable in an intermittent manner, at a current that is applied in a pulsed manner and a voltage that is applied in a pulsed manner, so as to alternate toward and away from the workpiece up to the terminal position. This particularly expedient design embodiment of the invention consequently provides a device in the case of which one and the same workpiece is processable in two different operating modes within one operating process, specifically in a first operating mode at a permanently applied current and voltage, the so-called "generator mode", and in a second operating mode at a current and voltage applied in a pulsed manner, the so-called "pulsed mode" or "PECM mode". In the first-mentioned operating mode, a current and voltage are permanently applied by way of the cathodes, thus the electrodes, and the workpiece, as the anode, at a simultaneous, preferably constant, permanent advancement of the electrodes. This first operating mode is carried out until a previously defined intermediate position which is detected by way of a suitable measuring technology is reached. A sufficient subtraction of material has already been performed in the first operating mode until the intermediate position is reached. Thereafter, switching over to a second operating mode takes places automatically by the control installation, said second operating mode serving for the fine processing, or final processing, respectively, of the surface. In this pulsed mode, the current and the voltage are applied only in a pulsed manner at a frequency of 5 to 15 Hz, for example. That is to say that said current and voltage are switched on and switched off at this frequency. When the current and the voltage are applied, the respective electrode in this pulsed operation is moved even closer to the workpiece, that is to say that the gap is reduced as compared to the gap width in the first operating mode. The flow of electrolyte by way of the gap is reduced if not almost completely inhibited by virtue of the very narrow gap. However, in order for the subtracted products to be able to be discharged, when the current and voltage pulse has ended and the current and the voltage are consequently switched off, the electrode is moved back slightly in a manner simultaneous with the switching off, such that the gap is temporarily enlarged and the electrolyte under pressure can flow through the gap, thereby flushing out the subtracted products. The electrode thereupon, at the respective frequency, is moved back to the subtraction position, and the current and the voltage are applied, etc. This second operating mode is maintained until the final geometry is reproduced.

By actuating the respective components in a corresponding manner by the control installation, it is thus possible according to the invention for two different operating modes to be processed during a single processing procedure, or a single motion cycle, respectively, from the initial position to the terminal position. This means that the device can be operated both in the generator operation as well as in the pulsed operation. Any re-clamping of the workpiece, thus a changeover of the device, is particularly advantageously not required herein. This means that the workpiece at all times remains in one and the same receptacle position; there are particularly advantageously no positioning tolerances whatsoever, which are ultimately unavoidable in the case of a changeover of the device. Since the same electrodes are also used in both operating modes, said electrodes thus also not being changed over, a tolerance or a reproduction error does not arise on that count either. The device according to the invention enables the advantages of both different operating modes to be utilized within a single processing procedure, this being associated with a processing of the workpiece surface that is outstanding due to the homogeneity thereof.

Each electrode herein is expediently assigned a sensor installation that communicates with the control installation, the position of each electrode being detectable by way of said sensor installation either directly or indirectly, wherein the control installation controls the operation so as to depend on the sensor detection. The respective sensor installation permits a highly precise position detection such that the exact position of the respective electrode is known at all times. Depending on the electrode position, the control installation controls the respective components so as to depend on the operating mode, thus in each case the torque motors which are responsible for the advancement, as well as the generator when the latter is to be varied in terms of the output thereof. In the pulsed mode, both the generator and each torque motor is forcibly controlled, wherein the attainment of the terminal position is detected per stroke by way of the respective sensor installation, the generator being accordingly controlled, said generator being switched on when the reproduction position is reached, and is again switched off in a manner corresponding to the controlled cycle frequency, whereupon the torque motor again moves the electrode back in order for the fluid gap to be opened, etc. The control installation optionally also controls a pump by way of which the electrolyte is conveyed and which, for example, in the generator mode is permanently active, while said pump in the pulsed mode is optionally likewise operated in a pulsed manner.

In a refinement of the invention, a positioning installation for automatically positioning the workpiece in the operating position in an operating chamber can be provided. This positioning installation enables a workpiece to be processed that is disposed on the former to be positioned in a highly precise manner (because this is optionally detected by way of a respective sensor system or measuring technology) in the operating chamber in which the subtraction takes place. The workpiece during the processing remains on the positioning installation such that clamping or positioning, respectively, on the latter also takes place only once.

The positioning installation preferably comprises a spindle that is movable in a linear manner, a receptacle installation for mounting the workpiece being provided on said spindle. This spindle which, for example, is vertically positioned enables the workpiece to be moved from above into the operating chamber and to be moved out in a corresponding manner after the processing has ended. Said spindle is naturally also assigned a respective drive motor, for example again a torque motor which enables a highly accurate precision.

It is conceivable herein for the spindle, and thus the workpiece, to perform a pure linear movement during the movement of the workpiece to the operating position, or to be at rest while the workpiece is in the operating position, respectively. Alternatively, it is conceivable for the spindle to be rotatable about the longitudinal axis thereof during the transfer of the workpiece to the operating position and/or while the workpiece is located in the operating position. In the case of a workpiece which already has an inherent geometry that is slightly twisted about the longitudinal axis, this enables the workpiece, in this case a vane component, for example, to be threaded between the electrodes by way of a slight rotating movement, thus for the twist as provided on the workpiece to be equalized by the slight rotating movement during the insertion movement. It is at times necessary for the workpiece to be rotated in a minimal manner also during the operation, for example by an angle of up to a maximum of 1°, depending on the geometry to be configured.

In a refinement of the invention, a magazine that is assigned to the positioning installation can be provided, a plurality of workpieces to be processed being introducible into said magazine, said workpieces being automatically retrievable by way of the positioning installation or an associated changeover installation, and optionally also being reintroducible there after processing. It is thus possible for the magazine to be stocked with the desired number of workpieces or the maximum number of workpieces that can be received, and to thereafter initiate a completely automatic operation, in that a fully automatic operation from retrieving the workpieces to be processed up to depositing the processed workpieces is provided. The positioning installation by way of the receptacle installation thereof is capable of automatically acquiring, positioning, and preferably transferring the respective workpiece to be processed back into the magazine. If a changeover installation is interposed between the magazine and the positioning installation, said changeover installation receives said workpiece and hands the latter over in a corresponding manner. This operation is also preferably controlled by way of the central control installation.

In order to enable an identical reception of the workpieces at all times, each workpiece is expediently received in a separate workpiece holder which is automatically acquirable by way of the positioning installation or the receptacle installation thereof, respectively. A defined interface that is identical from one workpiece to another is thus also provided therein.

Besides the device per se, the invention furthermore relates to a method for the electrochemical processing of a workpiece while using a device of the type described above. The method is distinguished according to the invention in that the electrodes during the processing are moved from the initial position in the direction of the workpiece to the terminal position, and a fluid is simultaneously pumped through the fluid duct between the workpiece and the electrodes, said fluid duct being radially delimited by the reproduction faces.

The control installation herein can control the operation of the device in such a manner that the electrodes, firstly, proceeding from the initial position, in a first operating mode having a permanently applied current and voltage are moved in the direction of the workpiece and after reaching a defined intermediate position, in a second operating mode in a pulsed operation, are moved in an intermittent manner, at a current and voltage that is applied in a pulsed manner, so as to alternate toward and away from the workpiece up to the terminal position.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
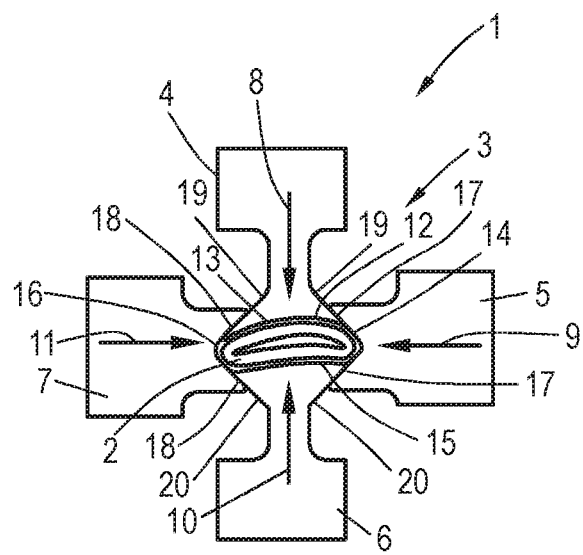
FIG. 1 shows a first electrode assembly of an ECM device having three electrodes in the initial position.

FIG. 1 as part of a device 1 according to the invention for electrochemically processing a metal workpiece 2 shows an electrode assembly 3, in the example shown comprising four separate electrodes 4, 5, 6, 7 which are all movable relative to the workpiece 2 by way of separate linear drive units (not shown in more detail here). The electrodes 4 to 7 form cathodes, while the workpiece 2 forms the anode. The electrodes 4 to 7 are movable in a linear manner along the motion axes 8, 9, 10, 11 by way of the linear drive units, wherein the motion axes 8 to 11 in the exemplary embodiment shown are mutually perpendicular.

When in operation, a permanent, closed, gap-type fluid duct 12 that encircles the workpiece 2 (shown in the cross section here) is provided, said fluid duct 12 in the exemplary embodiment shown being delimited radially, or externally, respectively, and sealed exclusively by way of the reproduction faces 13, 14, 15, 16 of the electrodes 4 to 7. An electrolyte which serves for the electrochemical processing of the workpiece 2 and by way of which subtracted products are simultaneously transported out of the fluid gap 12 flows in a manner perpendicular to the illustration plane under suitable pressure through the fluid duct 12.

FIG. 1 shows the initial position with the as yet still unprocessed workpiece 2. As can be seen, the electrodes 4 to 7 engage in one another, or mutually overlap in a peripheral manner. To this end, the mutually opposite electrodes 5 and 7 on the peripheries have planar sliding faces 17 and 18, respectively, which externally bear in a contacting and sealing manner on corresponding sliding faces 19, 20 of the likewise mutually opposite electrodes 4 and 6. Mutually interacting sliding faces are thus provided on adjacent electrodes. Having engaged in each case across two adjacent electrodes 4 and 6, the electrodes 5 and 7 in the region of the reproduction face have a quasi V-shaped geometry, wherein the actual reproduction geometry which is intended to reproduce the rounded edge of the workpiece 2 is configured between the sliding faces 17 and 18, respectively.

Each reproduction geometry 13 to 16 is in portions embodied in such a manner that said reproduction geometry in the terminal position shows the negative of the face portion of the completely processed workpiece 2 which is to be processed by the respective electrode 4 to 7. In the case of the electrodes 4 and 6, this is the upper and the lower side of the workpiece 2, the latter being a vane component for a turbomachine. In the case of the electrodes 5 and 7, these are the corresponding two edges of the workpiece 2 that have a small radius.

As described, FIG. 1 shows the electrode assembly 3 at the start of the actual ECM operation. The electrodes 4 to 7 are diverged to a relatively large extent; the degree of overlap is not yet very high. Thereafter, upon switching on the conveyance of electrolyte and applying the current, in a first operating mode, the so-called "generator sinking", with a constantly applied current and voltage, and with a linear adjustment path, the electrodes 4 to 7 are moved in a linear manner in the direction of the motion axes 8 to 11, thus in the direction of the arrows, and consequently pushed toward one another. By virtue of the current applied which can be several 1000 amperes and the voltage of 6 to 200 V, a subtraction of the workpiece material according to the ECM method takes place on the surface of said workpiece, that is to say that the workpiece volume is reduced. The respective surfaces are shaped by the respective opposite portions of the reproduction faces 13 to 17 of the respective electrodes 4 to 7.

The linear readjustment movement at a constant current and a constant voltage in the first operating mode (generator sinking) is maintained until a defined sink depth, thus a defined intermediate position, has been attained. This is detected by way of a suitable measuring technology or sensor system. Thereafter, an automatic switchover to a second operating mode, the so-called PECM mode, is performed by way of the central control installation. In said second operating mode, the current and the voltage are applied only in a pulsed manner at a frequency of 5 to 15 Hz, for example. A current and voltage pulse is applied when the respective electrode is located in the operating position. When the current is switched off, the electrode is slightly moved away from the workpiece 2 such that the fluid duct 12 is opened wider, the gap width thus being somewhat enlarged, enabling the electrolyte to better flow therethrough. Thereafter, the respective electrode is fed again and moved to the operating position, whereupon a current and a voltage are applied again, etc. An intermittent operation is thus provided both in terms of the current and voltage and in terms of the positioning of the electrode. It is to be noted herein that the gap width in the first operating mode, thus in generator sinking, is slightly larger than in the second operating mode, thus in the PECM operation. While the gap width in the first operating mode is approx. 0.2 to 0.3 mm, said gap in the second operating mode is, for example, 0.05 to 0.1 mm when a current and a voltage are applied, thus consequently when subtracting takes place. The gap width in the second operating mode is enlarged to, for example, 0.2 to 0.3 mm, by diverging the electrodes.

Figure 2:
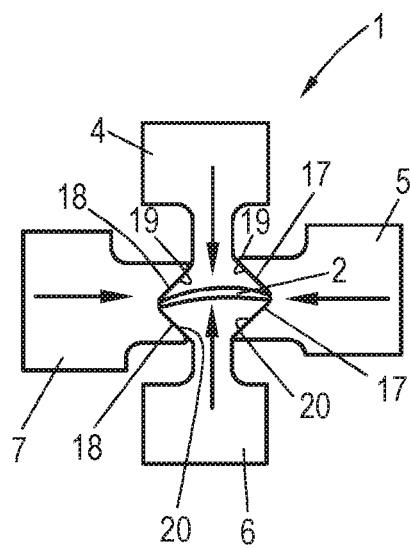
FIG. 2 shows the electrode assembly from FIG. 1 in the terminal position.

Two different operating modes are thus performed within a single processing procedure, that is to say a readjustment procedure, from an initial position shown in FIG. 1 to the terminal position shown in FIG. 2, the electrodes 4 to 7 being converged to a large extent therein (cf. FIG. 2). The overlap regions of the sliding faces 17, 18, and 19, 20 are accordingly greatly enlarged as compared to the initial position. As can be seen, the reproduction faces 13 to 16, by way of the face portions thereof that define the final contour of the workpiece 2 after the ECM processing, that is to say the portions in the region of the upper and the lower side and in the region of the two edges, are mutually complementary, defining the unequivocal three-dimensional final geometry that is reproduced on the workpiece 2. As the electrodes 4 to 7 are in mutual contact during the entire readjustment procedure from the initial position according to FIG. 1 to the terminal position according to FIG. 2 and seal the fluid gap 12, this final geometry is extremely homogeneous across the entire circumference of the workpiece, since a reproduction face of the respective adjacent electrode is opposite each location around the circumference of the workpiece 2, a subtraction of material accordingly taking place at each position. This subtraction of material that takes place at each position is ensured during the entire readjustment movement, independently of the operating mode, such that an extremely homogeneous subtraction and thus also an extremely homogeneous surface pattern can be achieved.

The respective electrodes 4 to 7 extend across the entire length of the workpiece to be processed, the latter in the example shown being a vane part of a turbomachine. Said vane part at the front and the rear end is delimited by way of a vane root and a shroud ring, for example, the electrodes 4 to 7 plunging therebetween.

Figure 3:
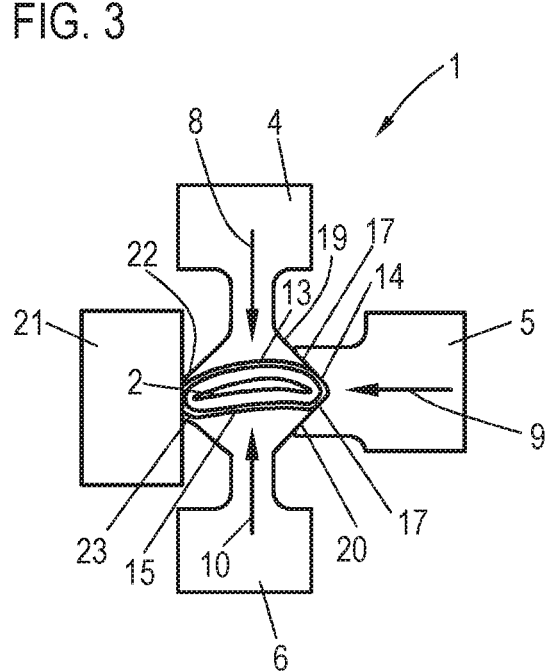
FIG. 3 shows a second electrode assembly of an ECM device having four electrodes in the initial position.
Figure 4:
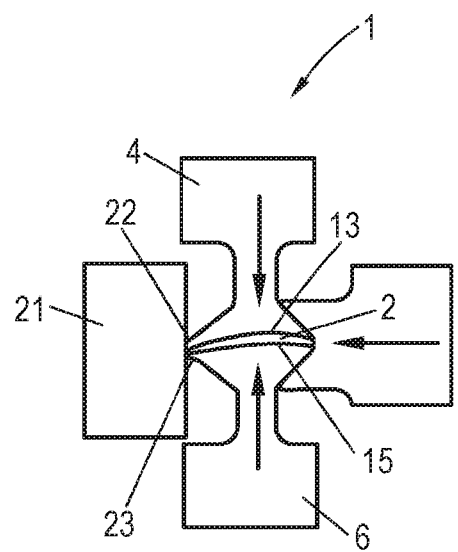
FIG. 4 shows the electrode assembly from FIG. 3 in the terminal position.

FIGS. 3 and 4 show a further partial view of an ECM device 1 according to the invention, wherein the same reference signs are used for the same components. Only three electrodes 4, 5, 6 are provided here, said electrodes 4, 5, 6 having respective reproduction faces 13, 14, 15. As is the case in the design embodiment according to FIGS. 1 and 2, the electrode 5 by way of the sliding faces 17 thereof engages across the respective adjacent sliding faces 19 and 20 of the electrodes 4 and 6.

In the case of this embodiment, only one electrode 5 that reproduces on the edge is provided. A positionally fixed duct component 21 is provided on the opposite side, the two electrodes 4 and 6 by way of corresponding edge portions 22, 23 (shaped somewhat differently here) bearing in a sliding and sealing manner on said duct component 21.

Here too, the electrodes 4 to 6 by way of respective linear drive units are capable of being converged in a linear manner along the motion axes 8, 9, 10, said electrodes 4 to 6 by way of the sliding faces 17, 19 and 20 thereof sliding on one another, while the electrodes 4, 6 by way of the edge regions 22, 23 thereof slide on the duct component 21. In the terminal position shown in FIG. 4, the degree of overlap of the electrode 5 with the electrodes 4 and 5 has again been significantly enlarged, in a manner similar to the exemplary embodiment according to FIGS. 1 and 2. The edge portions 22, 23 of the electrodes 4, 6 bear on one another on the opposite edge side of the workpiece 2. By virtue of the geometry of the respective reproduction faces 13, 15 of the two electrodes 4, 6 in the transition toward the edge portions 22, 23 it is possible also in the case of this design embodiment having only three electrodes for the edge of the workpiece 2 in this region to likewise be configured in a rounded manner so as to correspond to a predefined geometry.

Figure 5:
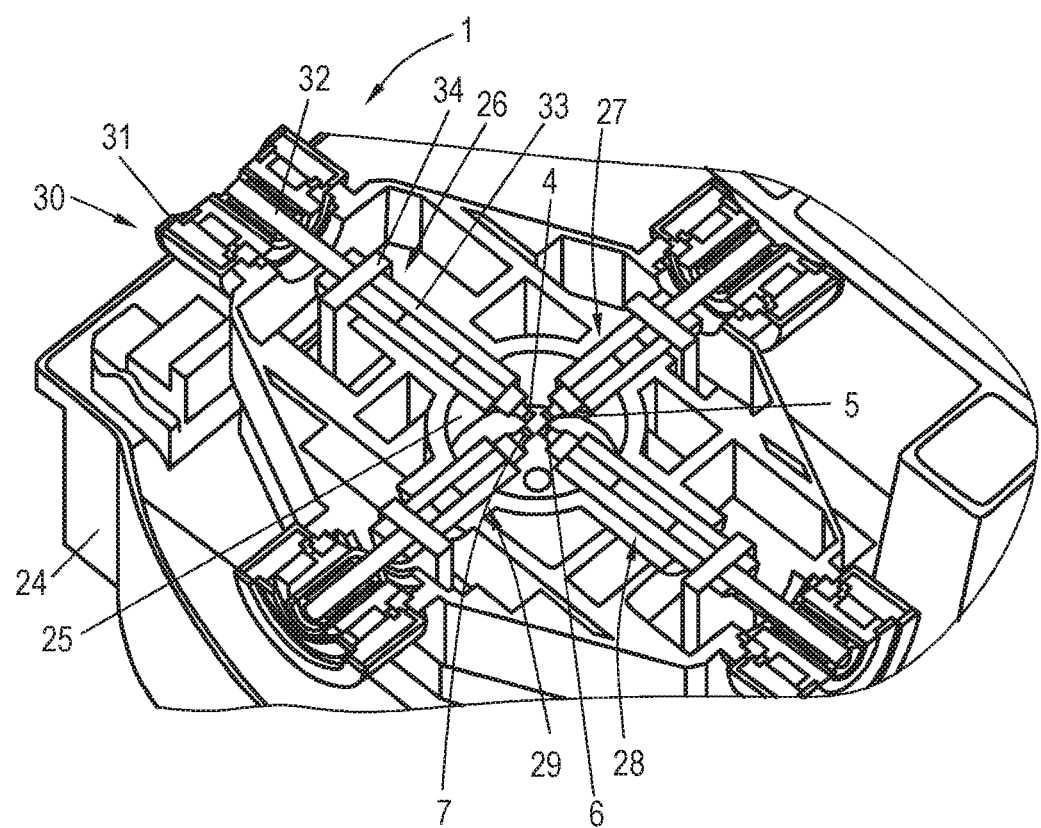
FIG. 5 shows a sectional partial view of an ECM device with an illustration of the electrodes and the linear drive units of the latter.

FIG. 5 in an enlarged detailed view again shows a fragment of an ECM device 1 according to the invention, having a machine frame 24 on which an operating chamber 25 in which the actual ECM processing takes places is provided. Shown in an exemplary manner are the four electrodes 4, 5, 6, 7 and the respective linear drive units 26, 27, 28, 29.

Each linear drive unit 26 to 29, of which only one will be described hereunder as the drive units are of a fundamentally identical construction, comprises a drive motor 30 in the form of a torque motor 31, comprising a drive spindle 32 to which an electrode holder 33 that is displaceable in a linear manner is connected. The drive spindle having an external thread is rotated by way of the torque motor 31. Said drive spindle is guided in a positionally fixed nut 34 and coupled to the electrode holder 33. Depending on the direction of rotation of the spindle, the electrode holder 33 is conjointly moved in a linear manner with the spindle 32 in the case of the spindle being rotated. The respective feed of the individual electrodes 4 to 7 is performed in this way. The construction, or the configuration, respectively, of the linear drive units 26 to 29 shown is merely exemplary. Other linear movement concepts are also conceivable; however, a common factor therein should be a torque motor 31 which enables a very rapid intermittent feed operation (because the latter is at a higher frequency) required for the PECM operation and also allows highly precise positioning, on the other hand.

All linear drive units 26 to 29 are separately actuatable, meaning that the superordinate control installation actuates each torque motor 31 separately such that the movement of the electrode can be performed in an optimal manner.

The linear drive units 26 to 29 in the case of the design embodiment according to FIG. 5 are positionally fixed. The torque motors 31 are thus immobile; only the spindles 32 and the electrode holders 33 are guided so as to be movable in a linear manner. This means that the angle between the motion axes of the linear drive units 26 to 29 is fixed, said angle being 90°, as is shown in an exemplary manner in FIG. 1.

Figure 6:
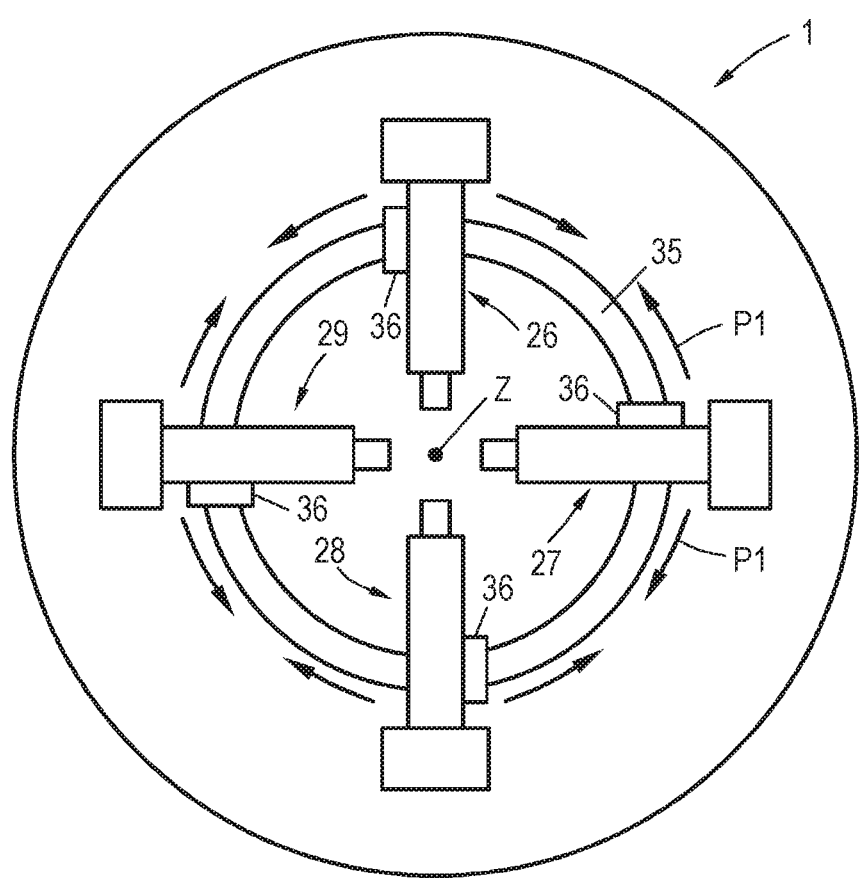
FIG. 6 shows a schematic illustration of an ECM device having pivotable linear drive units.

In order for there to be a potential for variation in terms of the axis angle, a partial view of a device 1 in which the individual linear drive units 26 to 29 are movable along a circular path (as is represented by the arrows P1) is shown in FIG. 6. To this end, for example, a circular guide path 35 on which the linear drive units 26 to 29 are mounted by way of separate slide components or similar (not shown in more detail here) is provided. Said slide components are rotatable about the center Z which lies in the center of the operating chamber 25. This is performed in an exemplary manner by way of a respective actuator or drive motor 36, preferably in the form of a torque motor or servomotor which each of the linear drive units 26 to 29 shown there has.

In this way, it is possible for the angle of the linear drive units 26 to 29 to be readjusted relative to one another should this be required for reasons of the geometry of the workpiece or of the electrode geometry of the replaceable electrodes, respectively.

Figure 7:
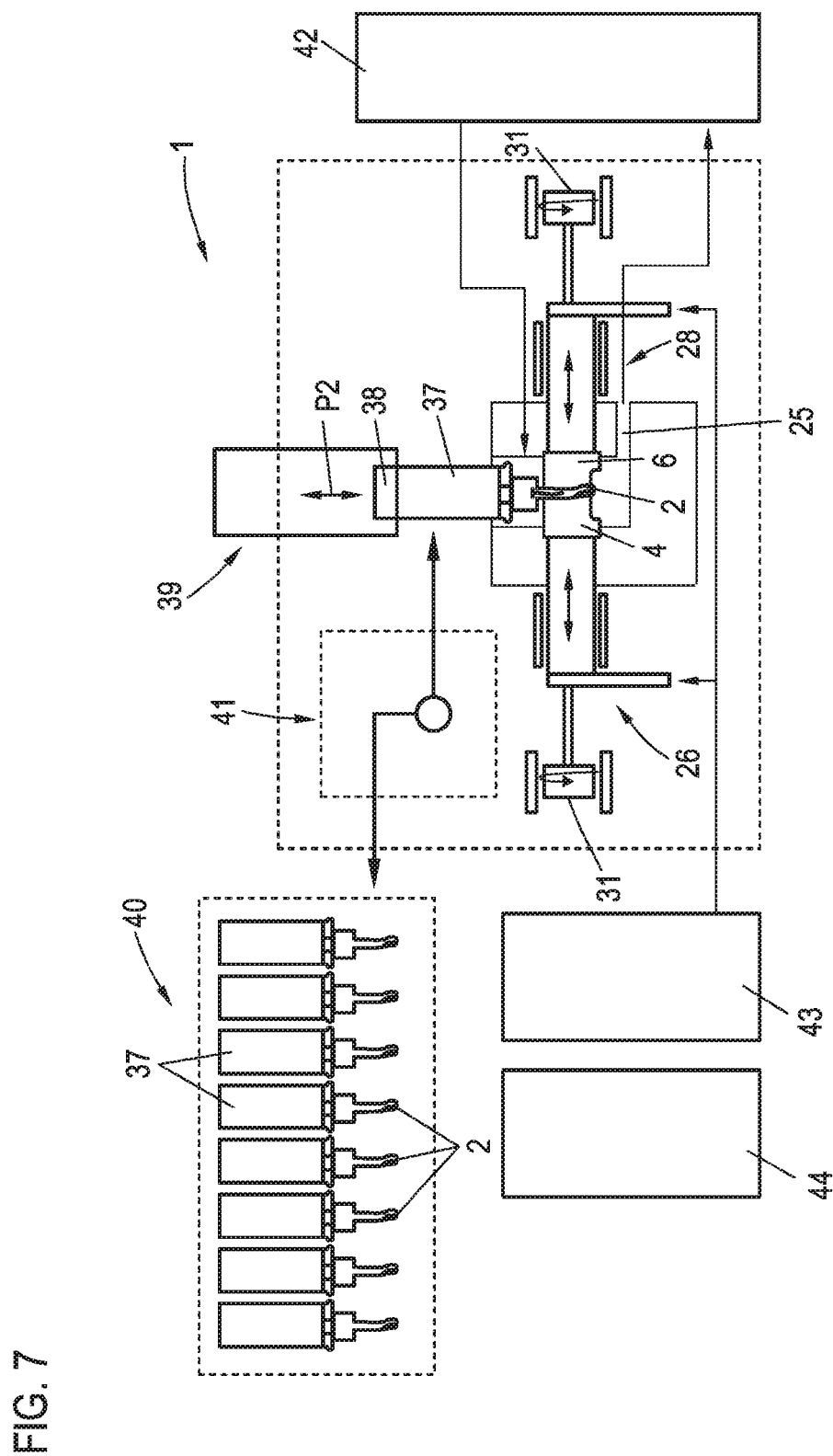
FIG. 7 shows a schematic illustration of an ECM device having all components.

FIG. 7 finally shows a schematic illustration of a device 1 according to the invention for carrying out the ECM method. Only the two linear drive units 26, 28 are shown in an exemplar manner here; the other two linear drive units are orthogonal to the former. Also illustrated are the two assigned electrodes 4, 6 and the workpiece 2 that is located therebetween.

The workpiece 2 is received or clamped, respectively, in a workpiece holder 37 which is acquired by a receptacle installation 38 of a positioning installation 39, or is clamped therein, respectively. The positioning installation 39 has a respective spindle (not shown) on which the receptacle installation 38 is disposed. By way of said receptacle installation 38 it is possible for the workpiece 2 to be moved into and out of the operating chamber 25, as is illustrated by the double arrow P2.

It is conceivable herein that the spindle, or the receptacle installation 38, respectively, to be rotated about the longitudinal axis thereof while the workpiece 2 is moved to the operating position, and/or or while the workpiece is located in the operating position, such that the workpiece 2 in the case of a respective twist thereon can be threaded between the electrodes 4 to 7.

A magazine 40 and an optimal changeover installation 41, illustrated by dashed lines here, are furthermore assigned to the positioning installation 39. A plurality of workpieces 2 to be machined, which are already fixedly disposed on respective workpiece holders 37, are received in the magazine 40. This magazine 40 can be stocked in advance by the person overseeing the device 1. When in operation, the changeover installation 41 acquires the respective workpiece holder 37 of the next workpiece to be machined, for example, and transfers said workpiece holder 37 to the positioning installation 39 which acquires said workpiece holder 37 by way of the receptacle installation 38 which is coupled to the spindle (not shown in more detail). The changeover operation of a processed workpiece 2 after processing is performed in the reverse order, said processed workpiece 2 by way of the changeover installation 41 being retrieved from the positioning installation 39 and transferred into the magazine 40.

Furthermore shown is a conveying and supplying installation 42 by way of which the electrolyte required for the ECM operation is supplied to the operating chamber 25 and discharged from the latter again in a closed circuit. The installation 42 comprises a suitable pump which makes available the required operating pressure.

Furthermore illustrated is the power supply 43, comprising a generator by way of which the electrodes 4 to 7, which form the cathodes, and the workpiece 2, which forms the anode, are supplied with the required operating current of several 100 to several 1000 amperes.

Furthermore shown is a central control installation 44 which controls the operation of all operating components of the device 1 according to the invention, thus the power supply installation 43 or the generator, respectively, the installation 42 for the supply of electrolyte, the positioning installation 39, and the changeover installation 41. Assigned to said central control installation 44 are respective sensor installations which determine corresponding operating or position parameters, etc., the control installation 44 controlling the operation based on said parameters. The measuring or sensor installations comprise respective sensors for the highly accurate detection of the respective electrode position, this being required for the feed operation of the torque motors 31 in both operating modes. Moreover, the respective positioning of the electrodes in the operating positions, or the deployed positions, in the PECM operation, etc., is also controlled by way of said control installation 44. The same applies of course to the positioning installation 39; here, the respective occupation of the terminal position of the workpiece 2, thus the operating position, is detected, such as of course also respective positionings or completions of procedures in the context of the changeover of parts, etc.

Furthermore, a highly precise actuation of the power supply 43, thus of the generator, is required in the PECM operation, since the latter is only pulsed. The pulse frequency of the generator 43, and thus also the frequency at which the torque motors 31 retract and deploy the electrodes, is in the range of usually 5 to 10 Hz, but can also be higher, for example up to 15 Hz.

The control installation 44 is in particular responsible for switching the operating mode of the device 1 according to the invention from the first operating mode, in which the electrodes 4 to 7 at a permanently and usually constantly applied current are preferably fed in a constant manner, to the second operating mode, the PECM operation, in which a pulsed subtraction of material is performed. The is trigger which serves for switching over from the first to the second operating mode is the detection of a corresponding position or intermediate position which is occupied by the electrodes 4 to 7 and which indicates that sufficient material has been subtracted by way of the respective electrode. A quasi rough subtraction by way of a relatively large subtraction of material is thus performed in the first operating mode, while the fine processing to the final contour is performed in the second, pulsed PECM mode. All this is performed in a single device by the operating mode switchover, and in a single motion cycle, and in a single clamping, meaning that the workpiece 2 remains at all times in one and the same position, and consequently does not have to be re-clamped, despite two different operating modes being carried out. This applies of course also to the electrodes 4 to 7 which are likewise used in the same position without any changeover procedure during both operating modes.

While specific embodiments of the invention have been shown and described in detail to illustrate the inventive principles, it will be understood that the invention may be embodied otherwise without departing from such principles.

We claim:

1. A device for the electrochemical processing of a metal workpiece, comprising a plurality of electrodes that by way of respective linear drive units are movable in a linear manner relative to the workpiece from an initial position to a terminal position, said electrodes having reproduction faces that are directed toward the workpiece, characterized in that at least three electrodes are provided, said electrodes being disposed so as to be offset around the circumference of the workpiece and by way of the reproduction faces of said electrodes during the entire readjustment movement from the initial position to the terminal position engaging across one another in portions so as to be in contact, and by way of the reproduction faces of said electrodes delimiting a fluid duct that in a closed manner encircles the circumference of the workpiece, wherein an electrode that is provided between two electrodes on the reproduction face has two sliding faces by way of which said electrode slides on respective outer sliding faces of the two adjacent electrodes.

2. The device according to claim 1, wherein two mutually opposite electrodes have the reproduction faces reproducing the upper and lower side of the workpiece, while the at least one third electrode, disposed between said two mutually opposite electrodes, has a reproduction face that preferably reproduces the edge region of the workpiece.

3. The device according to claim 2, wherein a fourth electrode, disposed opposite the third electrode, is provided, said fourth electrode preferably likewise having a reproduction face that reproduces the edge region of the workpiece.

4. The device according to claim 2, wherein the workpiece is a vane component of a turbomachine, having a vane portion with a flat, elongate cross section, wherein the first and the second electrode have reproduction faces reproducing the flat upper and the lower side, and the third and optionally the fourth electrode have reproduction faces reproducing the edge region having a small radius.

5. The device according to claim 1, wherein in the case of three electrodes the two outer electrodes slide along a positionally fixed duct component that delimits the fluid duct.

6. The device according to claim 1, wherein in the case of four electrodes two mutually opposite electrodes engage across the two other electrodes.

7. The device according to claim 1, wherein the motion axes of the linear drive units of two adjacent electrodes are set at a mutual angle of 90°.

8. The device according to claim 1, wherein the motion axes of the linear drive units of two adjacent electrodes are set at a mutual angle of smaller than or larger than 90°.

9. The device according to claim 1, wherein the linear drive units for readjusting the angle between the motion axes of two adjacent linear drive units are movable along a circular path.

10. The device according to claim 9, wherein each linear drive unit by way of an actuator motor is movable along the circular path.

11. The device according to claim 1, wherein each linear drive unit has a positionally fixed threaded spindle that is drivable by way of the drive motor, and a nut which runs on said threaded spindle and is coupled to an electrode holder, or in that an axially movable threaded spindle having an electrode holder coupled thereto is provided.

12. The device according to claim 11, wherein each drive motor is a torque motor.

13. The device according to claim 1, wherein a control installation is provided, the operation of the device by way of said control installation being controllable in such a manner that the electrodes, firstly, proceeding from the initial position, in a first operating mode having a permanently applied current and a permanently applied voltage are movable in the direction of the workpiece and after reaching a defined intermediate position, in a second operating mode in a pulsed operation, are movable in an intermittent manner, at a pulsed voltage and a current that is applied in a pulsed manner, so as to alternate toward and away from the workpiece up to the terminal position.

14. The device according to claim 13, wherein each electrode is assigned a sensor installation that communicates with the control installation, the position of the electrode being detectable by way of said sensor installation, wherein the control installation controls the operation so as to depend on the sensor detection.

15. The device according to claim 13, wherein a positioning installation for automatically positioning the workpiece in the operating position in an operating chamber is provided.

16. The device according to claim 15, wherein the positioning installation has a spindle that is movable in a linear manner, having a receptacle installation for mounting the workpiece.

17. The device according to claim 16, wherein the spindle is rotatable about the longitudinal axis thereof during the transfer of the workpiece to the operating position and/or while the workpiece is located in the operating position.

18. The device according to claim 15, wherein a magazine that is assigned to the positioning installation is provided, a plurality of workpieces to be processed being introducible into said magazine, said workpieces being automatically retrievable by way of the positioning installation or a changeover installation.

19. The device according to claim 18, wherein each workpiece is received in a workpiece holder which is acquirable by way of the positioning installation or the changeover installation.

20. A method for the electrochemical processing of a workpiece while using a device according to claim 1, wherein the electrodes during the processing are moved from the initial position in the direction of the workpiece to the terminal position, and a fluid is simultaneously pumped through the fluid duct between the workpiece and the electrodes, said fluid duct being radially delimited by the reproduction faces.

21. The method according to claim 20, wherein a control installation controls the operation of the device in such a manner that the electrodes, firstly, proceeding from the initial position, in a first operating mode having a permanently applied current and a permanently applied voltage are moved in the direction of the workpiece and after reaching a defined intermediate position, in a second operating mode in a pulsed operation, are moved in an intermittent manner, at a current that is applied in a pulsed manner and a voltage that is applied in a pulsed manner, so as to alternate toward and away from the workpiece up to the terminal position.

* * * * *